(12) United States Patent
Garg et al.

(10) Patent No.: US 7,757,178 B2
(45) Date of Patent: Jul. 13, 2010

(54) SYSTEM AND METHOD FOR GENERATING A CUSTOMIZED WORKFLOW USER INTERFACE

(75) Inventors: Man Mohan Garg, Cerritos, CA (US); Alok Mathur, Lake Forest, CA (US); Andrey Savov, Fullerton, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 336 days.

(21) Appl. No.: 11/463,878

(22) Filed: Aug. 10, 2006

(65) Prior Publication Data

US 2008/0040676 A1 Feb. 14, 2008

(51) Int. Cl.
G06F 3/048 (2006.01)
G06F 3/00 (2006.01)

(52) U.S. Cl. .............. 715/763; 715/762; 715/744; 715/866

(58) Field of Classification Search .......... 715/763, 715/762, 765, 866, 744
See application file for complete search history.

(56) References Cited

U.S. PATENT DOCUMENTS

| | | | | |
|---|---|---|---|---|
| 5,760,775 A | * | 6/1998 | Sklut et al. | 715/839 |
| 5,790,119 A | * | 8/1998 | Sklut et al. | 715/839 |
| 5,872,569 A | * | 2/1999 | Salgado et al. | 715/764 |
| 6,344,859 B1 | * | 2/2002 | Alimpich et al. | 715/762 |
| 6,380,951 B1 | * | 4/2002 | Petchenkine et al. | 715/736 |
| 6,483,524 B1 | * | 11/2002 | Petchenkine et al. | 715/763 |
| 6,624,908 B1 | * | 9/2003 | Petchenkine et al. | 358/1.15 |
| 7,242,498 B2 | * | 7/2007 | Fujiwara | 358/1.16 |
| 7,263,661 B2 | * | 8/2007 | Chavers et al. | 715/744 |
| 7,382,479 B2 | * | 6/2008 | Hirose et al. | 358/1.15 |
| 7,405,836 B2 | * | 7/2008 | Hube et al. | 358/1.15 |
| 2003/0103232 A1 | * | 6/2003 | Twede | 358/1.15 |

* cited by examiner

Primary Examiner—Tadesse Hailu
Assistant Examiner—Nicholas S Ulrich
(74) Attorney, Agent, or Firm—Tucker Ellis & West LLP (57) ABSTRACT

The subject application is directed to a system and method for generating a customized workflow user interface. Predetermined graphical user interface elements are first stored in an associated data storage. The graphical user interface elements are then generated on an associated display. Each graphical user interface element is then associated with an abstraction interface. Selection data is then received corresponding to selected graphical user interface elements. User interface data is thereafter generated in accordance with the selection data and the associated abstraction interface. Workflow data is subsequently output representing document processing operations corresponding to the selected graphical user interface elements. Thereafter, the workflow data is communicated to an associated document processing device.

24 Claims, 5 Drawing Sheets

SYSTEM AND METHOD FOR GENERATING A CUSTOMIZED WORKFLOW USER INTERFACE

BACKGROUND OF THE INVENTION

The subject application is directed to a system and method for generating a customized workflow user interface. More particularly, the subject application is directed to a system and method for allowing a user to customize a user interface to create a customized workflow or to provide enhanced or specialized functionality or services.

Typically, document processing devices, such as multifunctional peripheral devices, have included a user interface having pre-defined functions or operations which are accessible via the user interface, such as copy, scan, fax, or print. Multifunctional peripheral devices are being enhanced such that these devices have the ability to perform many more functions in addition to basic copying, scanning, faxing, or printing. It is desirable for a user to be able to access these additional functions from the user interface of the device, rather than having to access such functions via an associated workstation and then locate the device to retrieve the job. Currently, in order for a user to customize a user interface to include additional functions, the user would need access to the device source code and the customization process would be very time consuming and prone to error. It would be desirable to have a multifunctional peripheral device with an extensible user interface which is easily modified to include new functions and adapt to a user's workflows. Such a user interface would allow users to quickly create a customized user interface and workflow which meets the user's needs and requirements.

The subject application overcomes the above noted problems and provides a system and method for generating a customized workflow user interface.

SUMMARY OF THE INVENTION

In accordance with the subject application, there is provided a system and method for generating a customized workflow user interface.

Further, in accordance with the subject application, there is provided a system and method for allowing a user to customize a user interface to create a customized workflow or to provide enhanced or specialized functionality or services.

Still further, in accordance with the subject application, there is provided a system and method for generating a user interface which is easily modified to include new functions and adapt to a user's workflows.

Still further, in accordance with the subject application, there is provided a system for generating a customized workflow user interface. The system includes means adapted for storing data representative of a plurality of predetermined graphical user interface elements and means adapted for generating data representative of the plurality of graphical user interface elements on an associated display, wherein each of the plurality of predetermined graphical user interface elements are associated with an abstraction interface. The system also includes means adapted for receiving selection data representative of a plurality of selected graphical user interface elements from the plurality of predetermined graphical user interface elements and interface generator means adapted for generating user interface data in accordance with the selection data and associated abstraction interface. The system further comprises output means adapted for outputting workflow data representative of a plurality of document processing operations corresponding to the selected graphical user interface elements and means adapted for communicating the workflow data to an associated document processing device.

In one embodiment, the system further comprises means adapted for receiving at least one secondary graphical user interface element. In this embodiment, the interface generator means includes means adapted for generating the user interface data in accordance with the at least one secondary graphical user interface element and the output means includes means adapted for outputting workflow data corresponding to at least one secondary graphical user interface element.

In another embodiment, the abstraction interface is comprised of application user interface wrappers corresponding to the graphical user interface elements. Preferably, the graphical user interface elements include at least one of windows, edit boxes, and push button graphical elements.

In a further embodiment, the workflow data includes data representative of at least one document processing operation. Preferably, the at least one document processing operation is facsimile transmission, printing, scanning, copying, file transfer, file storage or electronic mail transmission.

Still further, in accordance with the subject application, there is provided a method for generating a customized workflow user interface in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for generating a customized workflow user interface. In particular, the subject application is directed to a system and method for allowing a user to customize a user interface to create a customized workflow or to provide enhanced or specialized functionality or services. More particularly, the subject application is directed to a system and method for generating a user interface which is easily modified to include new functions and adapt to a user's workflows. It will become apparent to those skilled in the art that the system and method described herein are suitably adapted to a plurality of varying electronic fields employing user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
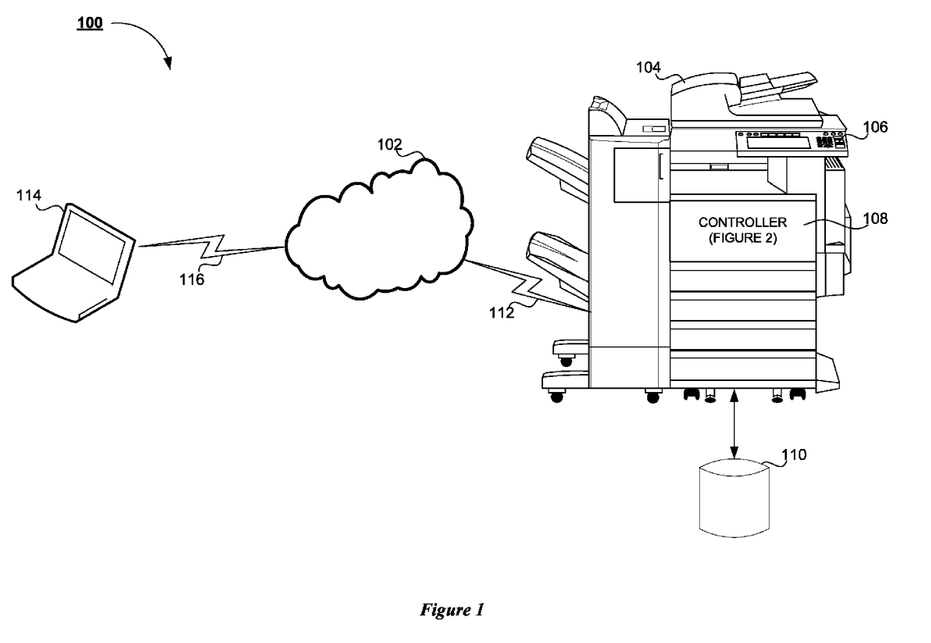
FIG. 1 is an overall diagram of the system for generating a customized workflow user interface according to the subject application.

Referring now to FIG. 1, there is shown a system 100 for generating a customized workflow user interface in accordance with the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, file storage, file transfer, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. In addition thereto, the subject application further enables the accessing of external resources via the document processing device 104. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, or the like, to an associated user, receive input from the associated user, and communicate the same to a backend component, such as a controller 108, as explained in greater detail below. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with the subject application, the document processing device 104 further incorporates a backend component, designated the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a customized workflow user interface of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a variety of graphical elements, workflows, documents, applications, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like. Preferably, the data storage device 110 includes data representative of a plurality of graphical user interface elements, data representative of one or more document processing workflows, an extensive set of application programming interface wrappers associated with the graphical user interface elements, and the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

Figure 2:
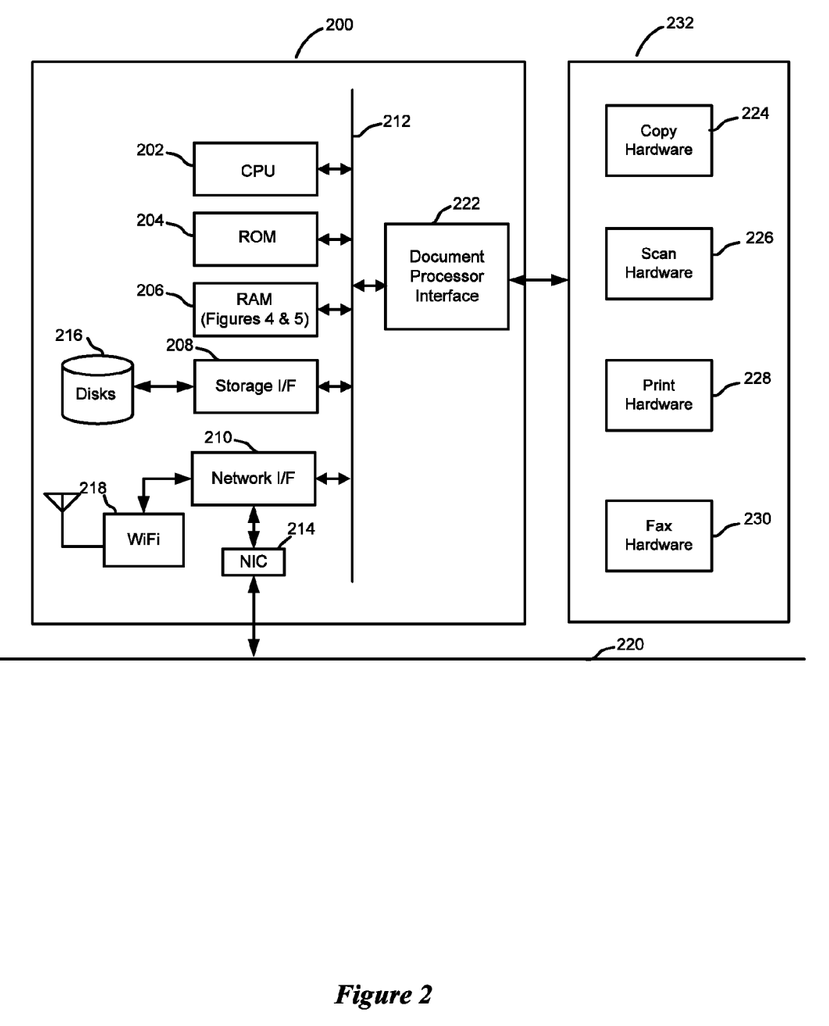
FIG. 2 is a block diagram illustrating controller hardware for use in the system for generating a customized workflow user interface according to the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, illustrated in FIG. 1 as the storage device 110, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with bus 212 is a document processor interface 222. Document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that a controller suitably operates any or all of the aforementioned document processing operations. Systems accomplishing more than one document processing operation are commonly referred to as multifunction peripherals or multifunction devices.

Figure 3:
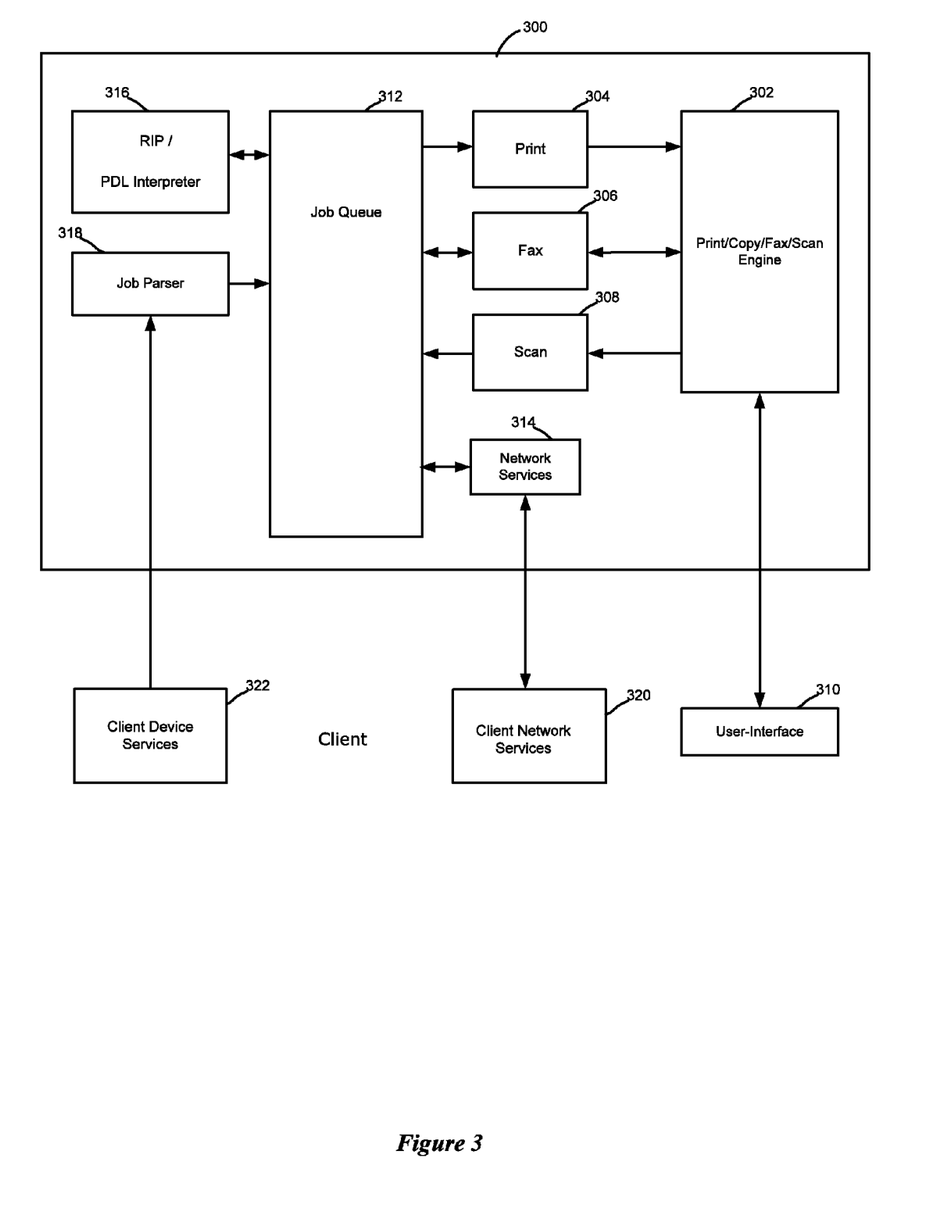
FIG. 3 is a functional diagram illustrating the controller for use in the system for generating a customized workflow user interface according to the subject application.

Functionality of the subject system 100 is accomplished on a suitable document processing device 104 that includes the controller 200 of FIG. 2, (shown in FIG. 1 as the controller 108), as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, predetermined graphical user interface elements are first stored for later access. The graphical user interface elements are then generated on an associated display. Preferably, each element is associated with an abstraction interface. Selection data, corresponding to a selected graphical user interface element is then received. User interface data is thereafter generated according to the selection data and the associated abstraction interface. Workflow data is then output representing a document processing operation. In accordance with the subject application, the document processing operation corresponds to the selected graphical user interface element selected. Thereafter, the workflow data is communicated to an associated document processing device.

In accordance with one example embodiment of the subject application, predetermined graphical user interface elements are stored in the associated data storage device 110. Preferably, the graphical user interface elements include, for example and without limitation, windows, edit boxes, push buttons, check boxes, icons, indicia, and the like. The graphical elements are stored on the data storage device 110, thereby providing access thereto via the controller 108, remote access via the user device 114, or the like. The graphical user interface elements are then generated on an associated display, such as the display associated with the user interface 106. During this generation of the elements on the associated display, each element is associated with an abstraction interface. Preferably, the association between abstraction interface and graphical user interface element is stored in accessible memory, such as the data storage device 110. As will be understood by those skilled in the art, an abstraction interface is any application program interface wrapper over common graphical user interface elements, as are known in the art. Preferably, the abstraction interface is based on an extensible markup language, e.g., XML.

A backend component, such as the controller 108, then receives selection data, via the display associated with the user interface 106, corresponding to one or more graphical user interface elements selected by an associated user. The skilled artisan will appreciate that such selection data is capable of originating from a remote user via the user device 114, directly via the user interface 106 associated with the document processing device 104, or the like. User interface data is then generated by the controller 108 in accordance with the received selection data and the abstraction interface associated therewith. Workflow data representing document processing operations corresponding to the selected graphical user interface elements is then output. A determination is then made whether a secondary graphical user interface element has been selected by the associated user. When no such element is detected, the workflow data is communicated to a workflow implementation component associated with the controller 108 of the document processing device 104. That is, the controller 108 stores the workflow data in memory and begins to implement the workflow on the associated document processing device 104. The skilled artisan will appreciate that the controller 108, one of its myriad of components, or other component associated with the document processing device 104, is capable of facilitating the communication of the workflow data to the workflow implementation component of the controller 108 tasked to implement document processing workflows.

When a secondary element has been selected by an associated user, user interface data is generated in accordance with the second element selected. Thereafter, workflow data representing document processing operations corresponding to the selected secondary element is output. This secondary element associated workflow is then communicated by the controller 108 associated with the document processing device 104 to a workflow implementation component.

For example, when an associated user desires to add a graphical user interface element, such as a custom push button, for a scan-to-email document processing operation, the user first selects a desired graphical user interface element, i.e., the push button element. Preferably, the user then selects parameters corresponding to the workflow to be associated with the push button element, i.e., transmit documents to a specific destination address, or the like. The controller 108, via a suitable component associated therewith, then generates user interface data according to the selected graphical element and the abstraction interface with which it is associated. Workflow data is then output representing the scan-to-email operation corresponding to the graphical user interface element selected, i.e., the custom push button. The skilled artisan will appreciate that the workflow data is thereby associated with the push button, which is then displayed on the user interface 106 associated with the document processing device 104. Thus, subsequent selection of the graphical element, e.g., push button, by the user will implement the scan-to-email workflow, including the specific destination address, on the document processing device 104.

The skilled artisan will appreciate that other document processing operations are equally capable of being selected by the associated user and the use of the scan-to-email operation is for example purposes only. In accordance with the subject application, a secondary graphical element is also capable of being included in the desired workflow, for example a print operation. That is, in addition to the scanning of a document and transmitting the document to the specific destination, the user is capable of adding a print operation, such that the electronic mail message, or a hardcopy of the document, is output in accordance with the selection of the secondary graphical user interface element.

In accordance with one example embodiment of the subject application, a user associated with the document processing device 104 is able to edit and add screens to a graphical user-interface displayed on the user interface 106. Custom event-handler shared libraries for each new screen are then uploaded via any suitable means known in the art. It will be appreciated by those skilled in the art that custom event-handler shared libraries are a collection of subprograms used to develop each screen, which include, for example and without limitation, callback functions. A workflow builder component is then edited to include a new workflow. Various custom components required for implementing the desired workflow, as will be understood by those skilled in the art, are then uploaded to the controller 108 associated with the document processing device 104. A particular graphical element is then selected by the user to be associated with the desired workflow. Preferably, callback implementations, or functions, then set custom parameters that define the new workflow, e.g., electronically mailing one or more documents from a particular web address to a specific electronic mail address, retrieving one or more documents from a particular web address and printing the retrieved document or documents, or the like. The skilled artisan will appreciate that callback implementations, or functions, are executable code that is passed as an argument to other code, which includes, for example and without limitation, OnLoad, PushButtonClick, InputEditDone, OnEvent, or the like. Upon selection of the graphical element, the workflow builder component determines the appropriate workflow, using the various components available, and executes the new workflow. Thus, custom transfer agents download the document from the specified web address and forward the retrieved document to a default scan-to-email agent. A custom transfer agent, as will be understood by those skilled in the art, is a computer program or agent that transfers data from one point to another, including, for example and without limitation, an agent to perform a specialized service, such as to retrieve a document from a specified web address, or the like. The default agent then transmits, via electronic mail, the retrieved document to the designated electronic mail address. The skilled artisan will appreciate that the foregoing example describes one of a plurality of applications of the subject application, as will be apparent to those skilled in the art.

Figure 4:
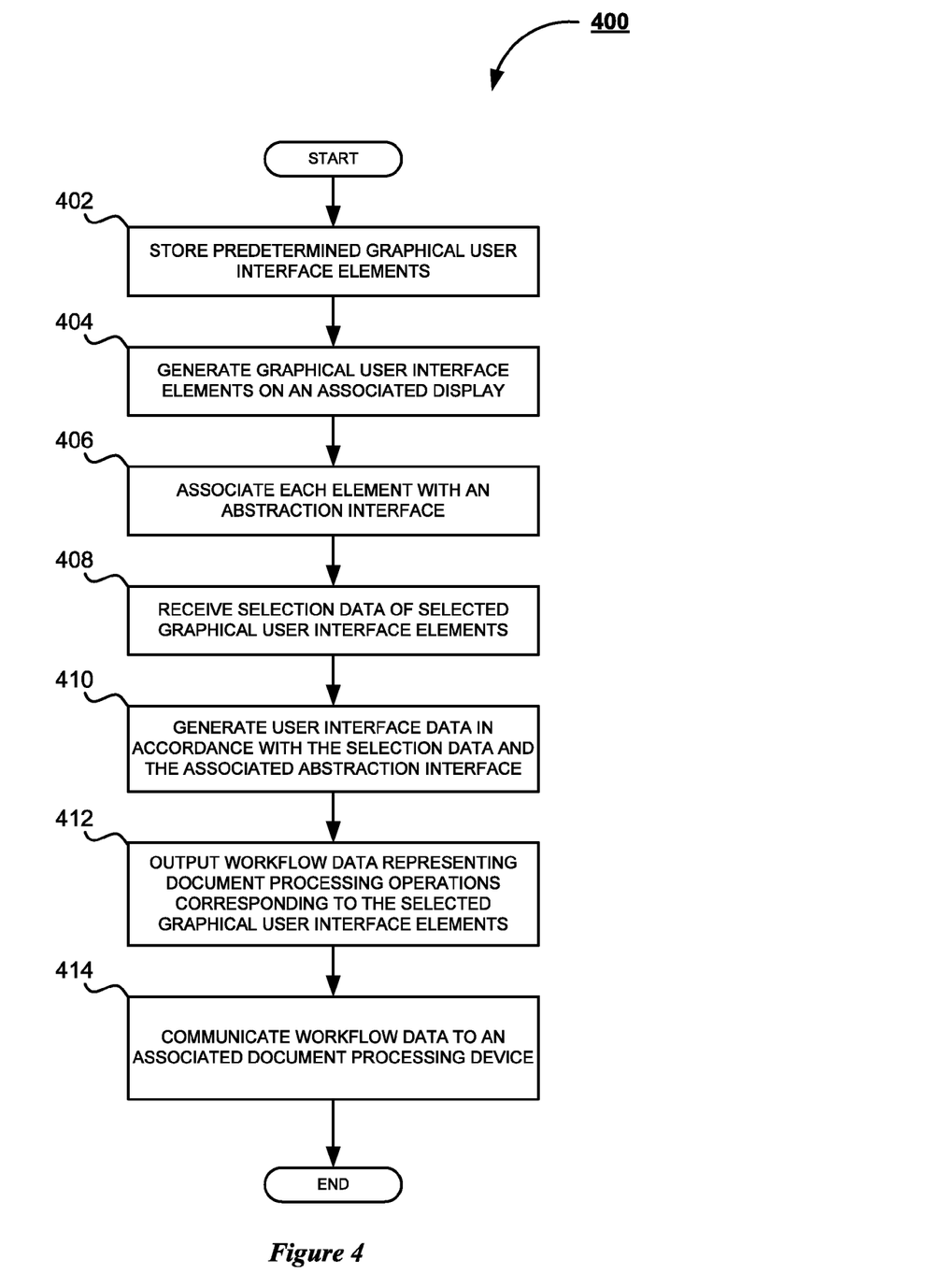
FIG. 4 is a flowchart illustrating a method for generating a customized workflow user interface according to the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a method for generating a customized workflow user interface in accordance with the subject application. Beginning at step 402, predetermined graphical user interface elements are stored via any suitable means known in the art. Preferably, the elements are stored in a data storage device 110 associated with the document processing device 104. At step 404, graphical user interface elements are generated on an associated display via any suitable means known in the art. For example and without limitation, the controller 108 directs the display of the elements on the associated user interface 106.

At step 406, each graphical user interface element is associated with an abstraction interface. As will be appreciated by those skilled in the art, the abstraction interface is any application program interface wrapper known in the art over common graphical user interface elements, including, for example and without limitation windows, edit boxes, push buttons, or the like. Preferably, the abstraction interface is based upon an extensible markup language, e.g., XML. Selection data is then received at step 408 corresponding to selected graphical user interface elements. Thus, a user associated with the customized workflow selects one or more graphical user interface elements from those displayed on the associated user interface 106. At step 410, user interface data is generated in accordance with the selection data and the associated abstraction interface. Workflow data is then output at step 412 representing document processing operations corresponding to the selected graphical user interface elements. Thereafter, at step 414, the workflow data is communicated to the associated document processing device 104.

Figure 5:
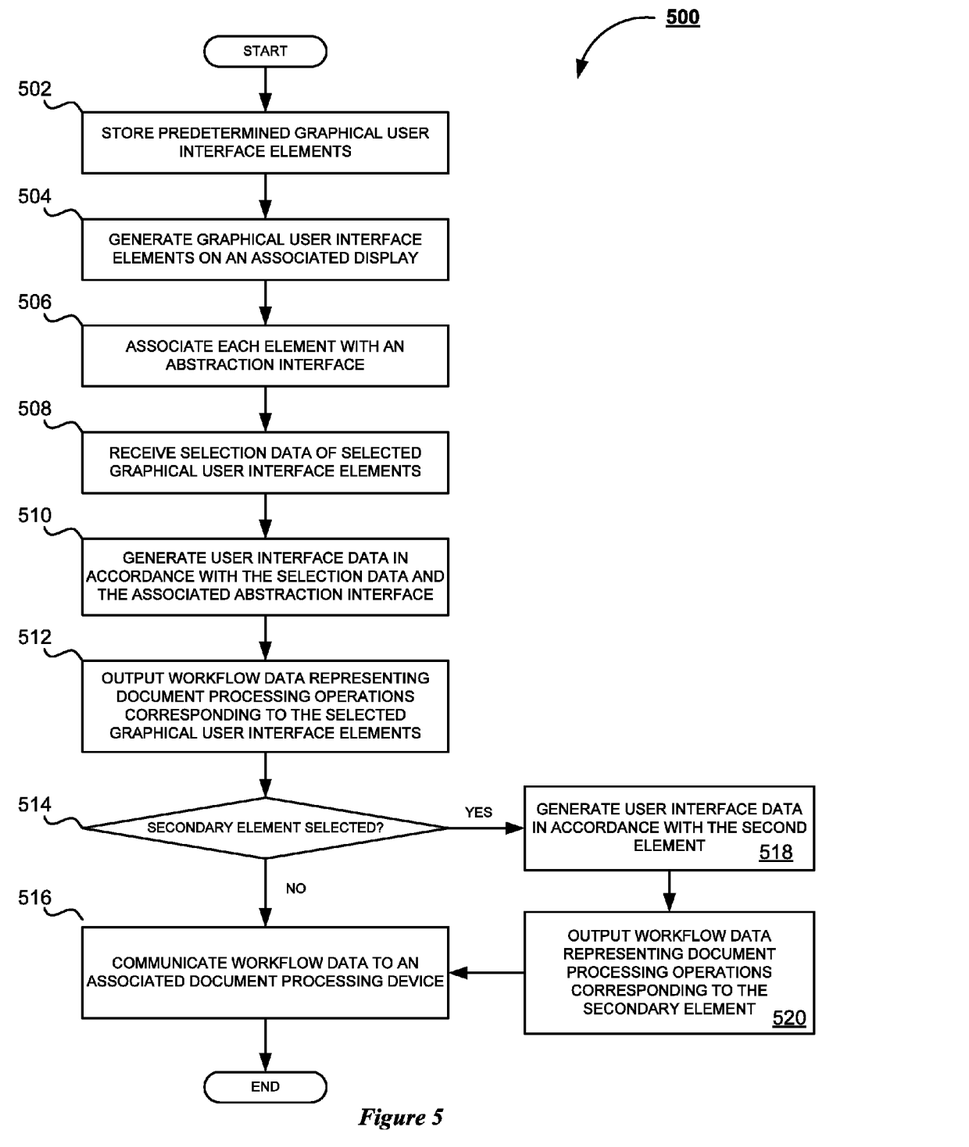
FIG. 5 is a flowchart illustrating a method for generating a customized workflow user interface according to the subject application.

Referring now to FIG. 5, there is shown a flowchart 500 illustrating a method for generating a customized workflow user interface in accordance with the subject application. The skilled artisan will appreciate that the methodology depicted in FIG. 5 corresponds to graphical and/or textual presentation, as applied to a user interface associated with a document processing device. The use of the subject methodology implemented with respect to a user interface of an associated document processing device is for illustration purposes, and the subject application is not limited only to such an implementation. The method begins at step 502 with the controller 108, or other suitable component of the system 100, storing predetermined graphical user interface elements in the associated data storage device 110. At step 504, one or more graphical user interface elements are generated on the display associated with the user interface 106 of the document processing device 104. The skilled artisan will appreciate that the generation of the graphical user interface elements is equally capable of being remotely displayed on the user device 114. Furthermore, as will be apparent to those skilled in the art, the method described with respect to FIG. 5 is capable of being performed remotely at the user device 114 and communicated to the document processing device 104 via the computer network 102.

Irrespective of where the elements are displayed, each element is associated at step 506 with an abstraction interface. As previously discussed, the abstraction interface is any application program interface wrapper over common graphical user interface elements, as are known in the art. At step 508, selection data of selected graphical user interface elements is received from the associated user. The skilled artisan will appreciate that such data is capable of being input by the associated user via the user device 114, the user interface 106, or other means, as are known in the art. User interface data is then generated at step 510 in accordance with the selection data and the associated abstraction interface. Workflow data representing document processing operations corresponding to the selected graphical user interface elements is then output at step 512.

A determination is then made at step 514 whether a secondary graphical user interface element has been selected by the associated user. That is, the controller 108, the user device 114, or other suitable component of the system 100, detects whether a second graphical user element has been selected by the associated user for implementation into the workflow. Upon a negative determination at step 514, flow proceeds to step 516, whereupon the workflow data is communicated to an associated document processing device 104. When the determination made at step 514 is positive, flow progresses to step 518, whereupon user interface data in accordance with the selected secondary graphical user interface element is generated. Workflow data representing document processing operations corresponding to the secondary user interface element is then output at step 520. Thereafter, flow proceeds to step 516, whereupon the workflow data, inclusive of both the first and secondary graphical user interface elements, is communicated to the associated document processing device 104.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A customized workflow user interface system comprising:
    means adapted for receiving user-inputted agent data defining a plurality of custom workflow agents, which custom workflow agents provide functionality not already available by document processing workflow data in an associated document processing device;
    means adapted for storing data representative of a plurality of predetermined graphical user interface elements corresponding to predetermined workflow functions of the associated document processing device and a plurality of secondary graphical user interface elements corresponding to each received custom workflow agent;
    means adapted for generating data representative of the plurality of graphical user interface elements on an associated display corresponding to the predetermined graphical user interface elements and the secondary graphical user interface elements, each of the plurality of predetermined graphical user interface elements being associated with an abstraction interface and each of the plurality of secondary graphical user interface elements being associated with custom event-handlers, the custom event-handlers including routines associated with development of at least one secondary screen on document processing device and at least one callback function representative of a conditional operation based on a document processing device event and customized device document transfer agents;
    means adapted for receiving selection data representative of a plurality of selected graphical user interface elements from the plurality of graphical user interface elements, including at least one custom workflow agent and at least one custom event-handler;
    interface generator means adapted for generating user interface data in accordance with the selection data and associated abstraction interface;
    output means adapted for outputting custom workflow data representative of a plurality of document processing operations corresponding to the selected graphical user interface elements; and
    means adapted for uploading the custom workflow data including the plurality of custom workflow agents and the at least one custom event-handler by an associated communication link to the associated document processing device for storage at the associated document processing device with the document processing workflow data.

2. The customized workflow user interface system of claim 1 further comprising means adapted for receiving at least one secondary graphical user interface element wherein:
    the interface generator means includes means adapted for generating the user interface data in accordance with the at least one secondary graphical user interface element; and
    the output means includes means adapted for outputting workflow data corresponding to the at least one secondary graphical user interface element.

3. The customized workflow user interface system of claim 1 wherein the abstraction interface is comprised of application user interface wrappers corresponding to the graphical user interface elements.

4. The customized workflow user interface system of claim 3 wherein the graphical user interface elements include at least one of windows, edit boxes, and push button graphical elements.

5. The customized workflow user interface system of claim 1 wherein the workflow data includes data representative of at least one document processing operation.

6. The customized workflow user interface system of claim 5 wherein the at least one document processing operation is facsimile transmission, printing, scanning, copying, file transfer, file storage, or electronic mail transmission.

7. A method for generating a customized workflow user interface comprising the steps of:
    receiving user-inputted agent data defining a plurality of custom workflow agents, which custom workflow agents provide functionality not already available by document processing workflow data in an associated document processing device;
    storing data representative of a plurality of predetermined graphical user interface elements corresponding to predetermined workflow functions of the associated document processing device and a plurality of secondary graphical user interface elements corresponding to each received custom workflow agent;
    generating data representative of the plurality of graphical user interface elements on an associated display corresponding to the predetermined graphical user interface elements and the secondary graphical user interface elements, each of the plurality of predetermined graphical user interface elements being associated with an abstraction interface and each of the plurality of secondary graphical user interface elements being associated with custom event-handlers, the custom event-handlers including routines associated with development of at least one secondary screen on document processing device and at least one callback function representative of a conditional operation based on a document processing device event and customized device document transfer agents;

receiving selection data representative of a plurality of selected graphical user interface elements from the plurality of graphical user interface elements, including at least one custom workflow agent and at least one custom event-handler;

generating user interface data in accordance with the selection data and associated abstraction interface;

outputting custom workflow data representative of a plurality of document processing operations corresponding to the selected graphical user interface elements; and uploading the custom workflow data including the plurality of custom workflow agents and the at least one custom event-handler by an associated communication link to the associated document processing device for storage at the associated document processing device with the document processing workflow data.

8. The method for generating a customized workflow user interface of claim 7 further comprising the step of receiving at least one secondary graphical user interface element wherein:

the step of generating user interface data includes generating the user interface data in accordance with the at least one secondary graphical user interface element; and the step of outputting workflow data includes outputting workflow data corresponding to the at least one secondary graphical user interface element.

9. The method for generating a customized workflow user interface of claim 7 wherein the abstraction interface is comprised of application user interface wrappers corresponding to the graphical user interface elements.

10. The method for generating a customized workflow user interface of claim 9 wherein the graphical user interface elements include at least one of windows, edit boxes, and push button graphical elements.

11. The method for generating a customized workflow user interface of claim 7 wherein the workflow data includes data representative of at least one document processing operation.

12. The method for generating a customized workflow user interface of claim 11 wherein the at least one document processing operation is facsimile transmission, printing, scanning, copying, file transfer, file storage, or electronic mail transmission.

13. A computer-implemented method for generating a customized workflow user interface comprising the steps of:

receiving user-inputted agent data defining a plurality of custom workflow agents, which custom workflow agents provide functionality not already available by document processing workflow data in an associated document processing device;

storing data representative of a plurality of predetermined graphical user interface elements corresponding to predetermined workflow functions of the associated document processing device and a plurality of secondary graphical user interface elements corresponding to each received custom workflow agent;

generating data representative of the plurality of graphical user interface elements on an associated display corresponding to the predetermined graphical user interface elements and the secondary graphical user interface elements, each of the plurality of predetermined graphical user interface elements being associated with an abstraction interface and each of the plurality of secondary graphical user interface elements being associated with custom event-handlers the custom event-handlers including routines associated with development of at least one secondary screen on document processing device and at least one callback function representative of a conditional operation based on a document processing device event and customized device document transfer agents;

receiving selection data representative of a plurality of selected graphical user interface elements from the plurality of graphical user interface elements, including at least one custom workflow agent and at least one custom event-handler;

generating user interface data in accordance with the selection data and associated abstraction interface;

outputting custom workflow data representative of a plurality of document processing operations corresponding to the selected graphical user interface elements; and uploading the custom workflow data including the plurality of custom workflow agents and the at least one custom event-handler by an associated communication link to the associated document processing device for storage at the associated document processing device with the document processing workflow data.

14. The computer-implemented method for generating a customized workflow user interface of claim 13 further comprising the step of receiving at least one secondary graphical user interface element wherein:

the step of generating user interface data includes generating the user interface data in accordance with the at least one secondary graphical user interface element; and the step of outputting workflow data includes outputting workflow data corresponding to the at least one secondary graphical user interface element.

15. The computer-implemented method for generating a customized workflow user interface of claim 13 wherein the abstraction interface is comprised of application user interface wrappers corresponding to the graphical user interface elements.

16. The computer-implemented method for generating a customized workflow user interface of claim 15 wherein the graphical user interface elements include at least one of windows, edit boxes, and push button graphical elements.

17. The computer-implemented method for generating a customized workflow user interface of claim 13 wherein the workflow data includes data representative of at least one document processing operation.

18. The computer-implemented method for generating a customized workflow user interface of claim 17 wherein the at least one document processing operation is facsimile transmission, printing, scanning, copying, file transfer, file storage, or electronic mail transmission.

19. A customized workflow user interface system comprising:

an input operable for receiving user-inputted agent data defining a plurality of custom workflow agents, which custom workflow agents provide functionality not already available by document processing workflow data in an associated document processing device;

a storage operable for storing data representative of a plurality of predetermined graphical user interface elements corresponding to predetermined workflow functions of the associated document processing device and a plurality of secondary graphical user interface elements corresponding to each received custom workflow agent;

a processor operable for generating data representative of the plurality of graphical user interface elements on an associated display corresponding to the predetermined graphical user interface elements and the secondary graphical user interface elements, each of the plurality of predetermined graphical user interface elements being associated with an abstraction interface and each of the plurality of secondary graphical user interface elements being associated with custom event-handlers, the custom event-handlers including routines associated with development of at least one secondary screen on document processing device and at least one callback function representative of a conditional operation based on a document processing device event and customized device document transfer agents;

an input operable for receiving selection data representative of a plurality of selected graphical user interface elements from the plurality of graphical user interface elements, including at least one custom workflow agent and at least one custom event-handler;

the processor further operable for generating user interface data in accordance with the selection data and associated abstraction interface;

an output operable for outputting custom workflow data representative of a plurality of document processing operations corresponding to the selected graphical user interface elements; and the processor further operable for uploading the custom workflow data including the plurality of custom workflow agents and the at least one custom event-handler by an associated communication link to the associated document processing device for storage at the associated document processing device with the document processing workflow data.

20. The customized workflow user interface system of claim 19 further comprising an input operable for receiving at least one secondary graphical user interface element wherein:

the processor is further operable for generating the user interface data in accordance with the at least one secondary graphical user interface element; and the output is further operable for outputting workflow data corresponding to the at least one secondary graphical user interface element.

21. The customized workflow user interface system of claim 19 wherein the abstraction interface is comprised of application user interface wrappers corresponding to the graphical user interface elements.

22. The customized workflow user interface system of claim 21 wherein the graphical user interface elements include at least one of windows, edit boxes, and push button graphical elements.

23. The customized workflow user interface system of claim 19 wherein the workflow data includes data representative of at least one document processing operation.

24. The customized workflow user interface system of claim 23 wherein the at least one document processing operation is facsimile transmission.

* * * * *